US008898157B2

(12) United States Patent
Levinson et al.

(10) Patent No.: US 8,898,157 B2
(45) Date of Patent: Nov. 25, 2014

(54) SYSTEMS AND METHODS FOR PROVIDING SEARCH RELEVANCY IN COMMUNICATION INITIATION SEARCHES

(75) Inventors: Stuart J. Levinson, Boston, MA (US); Riley W. Crane, Boston, MA (US); Sean Johnson, Chapel Hill, NC (US); Brian F. Buschmann, Fiesole (IT); James M. Byrum, San Francisco, CA (US); Jack Moffitt, Albuquerque, NM (US); Santhosh Balasubramanian, Pasadena, CA (US)

(73) Assignee: Path, Inc., San Francisco, CA (US)

( * ) Notice: Subject to any disclaimer, the term of this patent is extended or adjusted under 35 U.S.C. 154(b) by 0 days.

(21) Appl. No.: 13/557,912

(22) Filed: Jul. 25, 2012

(65) Prior Publication Data

US 2013/0054588 A1 Feb. 28, 2013

Related U.S. Application Data

(60) Provisional application No. 61/511,453, filed on Jul. 25, 2011, provisional application No. 61/511,471, filed on Jul. 25, 2011.

(51) Int. Cl.
*G06F 17/30* (2006.01)
*G06Q 10/10* (2012.01)

(52) U.S. Cl.
CPC ..................................... *G06Q 10/10* (2013.01)
USPC ......................................................... 707/728

(58) Field of Classification Search
USPC ......................................................... 707/728
See application file for complete search history.

(56) References Cited

U.S. PATENT DOCUMENTS

| 8,099,733 | B2* | 1/2012 | Birdwell et al. .............. 718/105 |
| 2001/0047270 | A1 | 11/2001 | Gusick et al. |
| 2002/0026483 | A1 | 2/2002 | Isaacs et al. |
| 2003/0097448 | A1 | 5/2003 | Menezes et al. |
| 2004/0218749 | A1 | 11/2004 | Shaffer et al. |
| 2005/0086290 | A1 | 4/2005 | Joyce et al. |
| 2006/0262922 | A1 | 11/2006 | Margulies et al. |
| 2010/0058234 | A1 | 3/2010 | Salame et al. |

(Continued)

FOREIGN PATENT DOCUMENTS

| WO | 2013016432 A1 | 1/2013 |
| WO | 2013/040037 A1 | 3/2013 |

OTHER PUBLICATIONS

Notification and Transmittal of the International Search Report and the Written Opinion of the International Searching Authority, or the Declaration for International Application No. PCT/US2012/48155, mailed Sep. 27, 2012, 16 pages.

(Continued)

*Primary Examiner* — Noosha Arjomandi
(74) *Attorney, Agent, or Firm* — Lando & Anastasi, LLP

(57) ABSTRACT

Systems and methods for generating relevant search results for a user are disclosed. In one example, the method comprises receiving a search query from the user performing a communication initiation search, receiving, by the computer system, search results from a search engine based on the search query, linking, by the computer system, the search results to a communications dataset generated based on communication metadata received from a communication system, and ordering, by the computer system, the search results based on the communication dataset in order from most relevant to least relevant to the user performing the communication initiation search.

18 Claims, 9 Drawing Sheets

(56) References Cited

U.S. PATENT DOCUMENTS

| | | | |
|---|---|---|---|
| 2010/0076837 A1 | 3/2010 | Hayes, Jr. et al. | |
| 2010/0138402 A1 | 6/2010 | Burroughs et al. | |
| 2010/0174709 A1* | 7/2010 | Hansen et al. | 707/728 |
| 2010/0268776 A1* | 10/2010 | Gerke | 709/204 |
| 2011/0158209 A1 | 6/2011 | Lundsgaard et al. | |
| 2012/0030232 A1* | 2/2012 | John et al. | 707/769 |
| 2012/0036148 A1* | 2/2012 | Jain et al. | 707/769 |
| 2012/0084283 A1* | 4/2012 | Chitiveli et al. | 707/728 |
| 2012/0158687 A1* | 6/2012 | Fang et al. | 707/706 |
| 2012/0253944 A1* | 10/2012 | Reese | 705/14.69 |
| 2013/0006698 A1 | 1/2013 | Roy et al. | |
| 2013/0054588 A1 | 2/2013 | Levinson et al. | |
| 2013/0054716 A1 | 2/2013 | Levinson et al. | |
| 2013/0066988 A1 | 3/2013 | Levinson et al. | |

OTHER PUBLICATIONS

Notification of Transmittal of the International Search Report and the Written Opinion of the International Searching Authority, or the Declaration for International Application No. PCT/US2012/54867, mailed Nov. 23, 2012, 7 pages.

* cited by examiner

SYSTEMS AND METHODS FOR PROVIDING SEARCH RELEVANCY IN COMMUNICATION INITIATION SEARCHES

RELATED APPLICATIONS

This application claims priority under 35 U.S.C. §119(e) to U.S. Provisional Application Ser. No. 61/511,453, entitled "SYSTEM AND METHOD FOR ABSTRACT COMMUNICATION," filed on Jul. 25, 2011, and 61/511,471 entitled "SYSTEM AND METHOD FOR PROVIDING SEARCH RELEVANCY IN COMMUNICATION INITIATION SEARCHES," filed on Jul. 25, 2011, which are to hereby incorporated herein by reference in their entirety.

BACKGROUND

1. Applicable Field

The field of the present invention relates generally to systems and methods for communicating with businesses, organizations or other entities.

2. Related Art

People may seek to personally communicate with businesses, organizations or other entities for various reasons. A person may wish, for example, to provide feedback, address customer service issues, make reservations, inquire about products or services, or find information not available through other methods. There are many communication options available, for example, calling or sending an email to a local business, calling or sending an email to a corporate office or initiating a web chat on the entity's website.

Typically the person performs a search using a search engine in an attempt to initiate communication with the entity. The person is searching for an implicit or explicit token, such as a phone number, an email address, or a Web contact form, that can be used to initiate communication with the entity. These tokens for any type of entity can be found on the entity's Web page (typically by following a "Contact" link). These tokens can also be found on place pages (specific type of Web page that describes a specific addressable geographic location), or using various service websites (review websites) or applications.

Numerous strategies have been used in the information retrieval field to improve search results by determining the most relevant search results for a user's query from the millions or billions of possible results. Most of these strategies involve ranking of Web pages based on their popularity and relevancy. In addition, results are often optimized based on updated content, cross-referencing of inbound and outbound links, meta tags and website description, as well as, Search Engine Marketing (selling of keywords by the search engines).

SUMMARY

It is appreciated that some customers find text-based communications with various business entities, for example email or web-chat systems, more convenient than making a phone call. Text-based communication may be preferred in noisy environments, where an audio conversation may be difficult or where conversations can be overheard by others. Text-based communication does not tie up phone lines and may allow for multi-tasking and interruptions. For these reasons, there is demand for businesses and organizations to provide text-based forms of communication.

Businesses, organizations and other entities may also prefer to channel customer service requests to text-based forms of communication to quickly and cheaply address any questions or concerns. But customers often find that text-based forms of communication with businesses, organizations and other entities can be inconsistent. For instance, response times to email inquires can depend on the nature of the inquiry, the size of the entity, and whether the entity has a dedicated customer service team. Different chat solutions exist for each business or organization with each chat solution having its own nomenclature, keyboard and mouse commands, look and feel, way of behaving, and software system requirements.

It is appreciated that even with all these communication options there is a communication gap between people attempting to initiation communication with an entity and the entities supplying the response. For example, if a person wants to contact a local branch of a chain store to find out if the store carries a specific brand of shoe in his or her size, the person would have to go to the store's website or search for the store in a search engine. After finding the local store's phone number, the person may call the store and ask an employee of the store to check inventory for that shoe. If the local store does not have the shoe in stock, the person would have to find and call the next store and repeat the process. Instead, the person may email corporate customer service and wait for a response, which may not come for a few days, or if one exists, initiate a web-chat with the corporate customer service.

These extra communication steps form the communication gap that can be time-consuming and frustrating for the person. Some solutions to this communication gap include web-chat systems provided by businesses on their websites. These web-chat systems allow a person visiting a business or organization's web site to initiate and conduct an online chat discussion with a representative of the business. In these web chat systems, the visitor initiates a chat and is then able to chat with a single available representative of the business. Typical systems are designed to allow an entity in the system to relate to one user or customer. Therefore, these systems necessitate a dedicated customer support person or team. However, not every business or organization can offer such a chat system or offer a team of dedicated customer support representatives.

Accordingly, there is a need for systems and methods for connecting individuals with businesses, organizations and other entities that allow the individuals to obtain information quickly and without the extra communication steps. Aspects and examples disclosed herein are directed to a system and method of providing a communication service that bridges the gap between the individual users and the entities and offers a single, universal communication solution.

Underlying this system is the premise that for every person, place, object, company, brand, organization, or other entity, there is an underlying human who can speak for the entity in question. In this system for abstract communication, the user has the ability to identify the desired communication entity and reach the human that can speak on behalf of that entity. Examples, though by no means exhaustive, include communicating with the officer representing a national park, an employee representing a corporation, an employee representing a corporation's product, a worker representing a political campaign, a repairmen representing maintenance, a farmer representing a bottle of wine, or a fisherman representing a catch.

The communication service provides for the entity to utilize its existing pool of employees and representatives to communicate on its behalf. Interfaces described herein further allow for any representative or agent of the entity to answer incoming messages by the users. Furthermore, such interfaces may allow for the agents to respond to inquiries from anywhere using a mobile device. According to various embodiments, such systems and methods streamline communications between individuals and organizations and allow for seamless transfer of information from the organization to the individual.

Methods and systems described herein allow users to send inquiries to various entities via the communication service without first searching for contact information or having any prior contact with the entity. The communication service provides relevant results for individuals attempting to initiate communication with businesses, organizations and other entities. The communication service described herein includes a search relevancy service that obtains search engine results and organizes the results to provide the most relevant entity information closest to the top of the search list.

According to one embodiment, a method for providing communication between a user and at least one entity is disclosed. The method comprises acts of receiving, by a computer system, a selection input of the at least one entity, and a message from the user to the at least one entity, analyzing, by the computer system, the selection input and the message to determine entity information and inquiry information associated with the message and the selection input; determining least one communication channel based on the entity information and the inquiry information, obtaining a response to the message via the at least one communication channel from the at least one entity, and transmitting the response to the user.

In one example, the act of obtaining the response to the message via the at least one communication channel comprises an act of transmitting a request based on the inquiry information and the entity information to a call center agent. In addition, the method further comprises the act of receiving the response, obtained by the call center agent from the at least one entity based on the request and transmitting the response to the user.

In another example, the act of obtaining the response to the message via the at least one communication channel further comprises generating the response by a message generator based on the entity information and the inquiry information. In addition, obtaining the response to the message via the at least one communication channel further comprise transmitting a request based on the inquiry information to at least one agent of the at least one entity and receiving a response from the at least one agent.

In one example, the method further comprises the acts of receiving information defining at entity contact information from the at least one entity, and transmitting the message to the at least one based on the entity contact information. In addition, receiving the message from the user and receiving the response from the at least one entity further comprises receiving at least one of a SMS text message, an email message, and a chat message.

According to another embodiment, a system for enabling communication between a user and at least one entity comprises an interface, configured to receive a selection input of the at least one entity, and a message from the user to the at least one entity, the message including entity information and inquiry information. The system may further include a processor, coupled to the interface and configured to analyze the message and the selection input to determine the entity information and the inquiry information associated with the message and the selection input and determine least one communication channel based on the entity information and the inquiry information.

In addition, the system may further include a database coupled to the processor and configured to store the entity information, the inquiry information and the message, wherein the interface is configured to receive the response to the message from the at least one entity via the at least one communication channel and transmit the response to the user. In one example, the database is configured to store the response and user information. In addition, the at least one communication channel comprises a call center communication channel, the interface is further configured to receive the response from a call center agent based on the inquiry information and the entity information.

In another example, the at least one communication channel comprises a direct entity communication channel, the interface is further configured to transmit the inquiry information to at least one entity via the direct entity communication channel and receive the response from an entity agent based on the inquiry information and the entity information. In addition, the direct entity communication channel may comprise a text messaging channel, an email messaging channel, and a chat messaging channel. In one example, the system further comprises a response engine configured to generate the response based on the based on the entity information and the inquiry information.

According to another embodiment, a method for generating relevant search results for a user comprises the acts of receiving a search query from the user performing a communication initiation search, obtaining search results from a search engine based on the search query, linking the search results to a communications dataset generated based on metadata received from a communication system, and ordering the search results based on the communication dataset in order from most relevant to least relevant to the user performing the communication initiation search.

In one example, wherein performing the communication initiation search further comprises performing a search by the user for contact information to initiate communication with an entity. In addition, ordering the search results based on the communication dataset may further comprise determining relevancy as a function of to responsiveness of the entity.

In another example, the method further comprises processing the metadata and generating the communication dataset based on the metadata. In one example, wherein the metadata comprises implicit metadata generated based on communications between users of the communication system and a plurality of entities and explicit metadata generated based on a rating value provided by users of the communication system, the rating value is based on communications between users of the communication system and a plurality of entities. In at least one example, processing the metadata further comprises assigning a weight value to the metadata based on an indication of the responsiveness of the entity.

In one example, the method further comprises providing the ordered search results to the user. In addition, obtaining search results from the search engine may further comprise obtaining a search engine dataset.

According to another embodiment, a system for generating relevant search results for a user performing a communication initiation search comprises an interface, configured to receive a search query from the user, and metadata from a communication system, and a search engine interface, configured to obtain search results from a search engine based on the search query. In one example, the system further comprises a communication dataset builder configured to analyze the metadata and generate a communication relevancy dataset based on the metadata, link the search results from the search engine to the communication relevancy dataset, and order the search results based on relevancy to the user performing a communication initiation search.

In one example, the user performing the communication initiation search further comprising the user performing a search for contact information to initiate communication with an entity. In addition, the communication dataset builder may be further configured to determine relevancy as a function responsiveness of the entity. In one example, the metadata comprises implicit metadata generated based on communications between users of the communication system and a plurality of entities and explicit metadata generated based on a rating value provided by users of the communication system, the rating value is based on communications between users of the communication system and a plurality of entities.

In another example, the communication dataset builder is further configured to process the metadata to generate the communication dataset based on the metadata. In addition, the communication dataset builder is further configured to assign a weight value to the metadata based on an indication of the responsiveness of the entity. In addition, the search engine interface may be further configured to obtain a search engine dataset from the search engine.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the invention. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
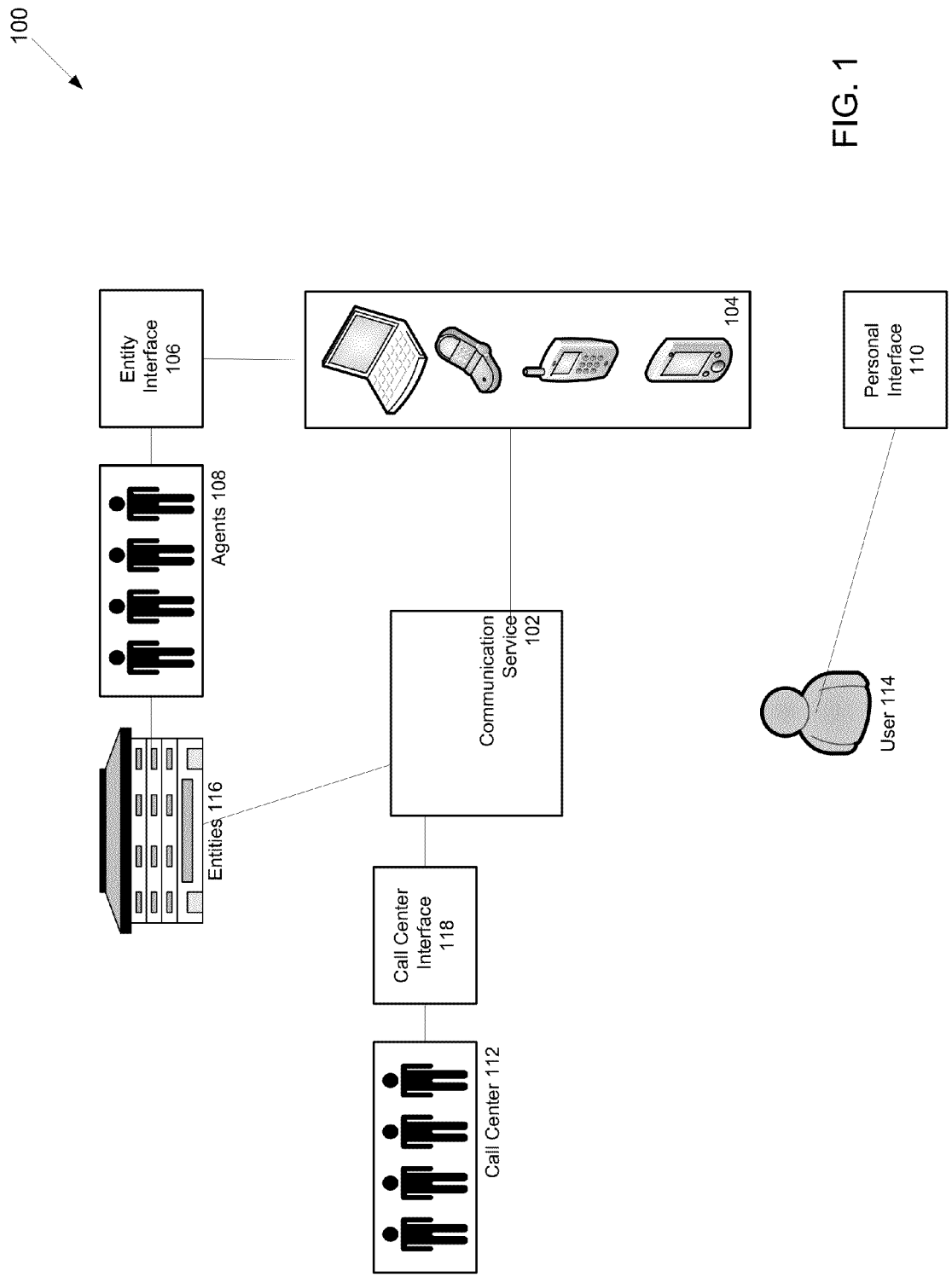
FIG. 1 is a block diagram of one example of a distributed communication system, according to one embodiment of the present invention.

As described above, currently existing communication options do not offer seamless communication desired by the user, necessitating additional steps or discrete, proprietary interfaces. Accordingly, there is a need for systems and methods that bridge the communication gap and make the additional steps or the proprietary interfaces transparent to the user. Aspects and examples disclosed herein relate to systems and methods for a communication service, which along with personal and entity interfaces, allow individual users to communicate with entities.

In addition, aspects and examples disclosed herein relate to systems and methods for providing a search relevancy service provides the most relevant search results for a user intending to communicate with entities. The search relevancy service collects data about the communications between entities and users, analyses this communication data and uses the data to rank the search results. The search results are then ordered from most relevant to least relevant ranking and displayed to the user seeking to initiate communication with the entity.

The entities can include products, businesses, nonprofit and for-profit organizations, government organizations, educational organizations, groups or professional organizations, and members of political organization such as senators and congressmen, and among other entities or groups. The communications to the entities may include a call to action on the part of the entity, such as, issuing a refund or returning an item, purchasing tickets, holding an item, reserving a table, or making an appointment. The communications may also be passive information on a particular topic or regarding a particular item (e.g. feedback). The communications can also include background information regarding the user, user specific circumstances, or past history.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Communication Service

FIG. 1 shows a distributed communication system 100 including a communication service 102 for managing and enabling communication of information between individuals and various entities. The distributed system can include the communication service 102, devices 104, an entity interface 106, agents 108, users 114, a personal interface 110, a call center 112 and a call center interface 118. In one example, the communication service 102 allows the users 114 to quickly communicate and obtain information from one or more entities 116.

According to various examples, one or more components of the distributed communication system 100 can be implemented using one or more computer systems, such as the distributed computer system 600 discussed below with regard to FIG. 6. Thus, examples of the distributed communication system 100 include a variety of hardware and software components configured to perform the functions described herein and examples are not limited to a particular hardware component, software component or a particular combination thereof.

For instance, the user 114 may provide one or more inputs to one of the devices 104, such as a cell phone, a smart phone, a PDA, a tablet computer, a laptop computer, a desktop computer or another system. Users 114 may interact with the devices 104 using the personal user interface 110, which may be provided on the devices. The personal user interface 110 may allow for inputs using keyword searches, geographical map searches and inputs, location based searching (e.g., within 2 mile radius of the present location), category selections (such as "restaurants"), and other methods of inputting search parameters. The searches are transmitted to the communication service 102, which may return search results comprising of one or more entities meeting the search criteria.

The user 114 can select one or more entities and input a message to one or more of the entities from the returned search list. The message can be one or many words or sentences and may include additional attachments such as images, videos, emails, or other attachment types. Virtually any information can be transmitted as part of the message. In another example, the same message can be sent to multiple entities. For example, the user can send a message to four jewelers located within a five radius of the user inquiring whether the jewelers can repair a particular watch brand.

In another example, the user 114 does not input search parameters and instead inputs the message into the message field directly. In this fashion, the user 114 can input a to general inquiry or an inquiry in a particular category in the context of the message. For example, the user inputs a message requesting a list of moderately restaurants in the downtown area, with parking, capable of taking a 7:00 PM dinner reservation. In another example, the user inputs a message that a tree in a particular park is damaged by termites.

In another example, the message is targeted to a particular individual. For instance, the message inquires about a particular state senator's position on a political issue or legislation of concern to the user. The message can also inquire or request information about a product without first locating manufacturer information. For instance, the user 114 may wish to communicate feedback regarding a defective home appliance and may reference a product name and a model number in the message.

The messages can then be transmitted to the communication service 102. The communication service 102 can determine how to respond to the messages based the message content, the entity information, and user information. The communication service can take one or more steps to obtain a response to the message. In one example, the steps are based on one or more paths or communication channels, for example, a direct communication channel, an auto-generated channel, a call center channel or a combination of the communication channels. The message can also be separated into multiple messages and each piece of the message can be addressed using a different communication channel.

According to some examples, the channels include transmitting the message to one or more entities 116 directly, transmitting the message to the call center 112, or auto-generating a response to the message by the communication service 102. Responses can be received from the entities or from the call center and forwarded to the user via the personal interface 110.

In various examples, communications between the devices 104 and the communication service 102 can be transmitted via a mobile telecommunications network. The network may further employ a plurality of access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio to network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 104 and other computing devices in the network.

Communications within the network, including any messages, requests and inquires can be transmitted or formatted to any format acceptable by the target system, such as, HTML and plain text emails, SMS messages, MMS messages, IM messages, audio messages, VOIP messages, plain text messages, any propriety format, among other communication standards.

Figure 2:
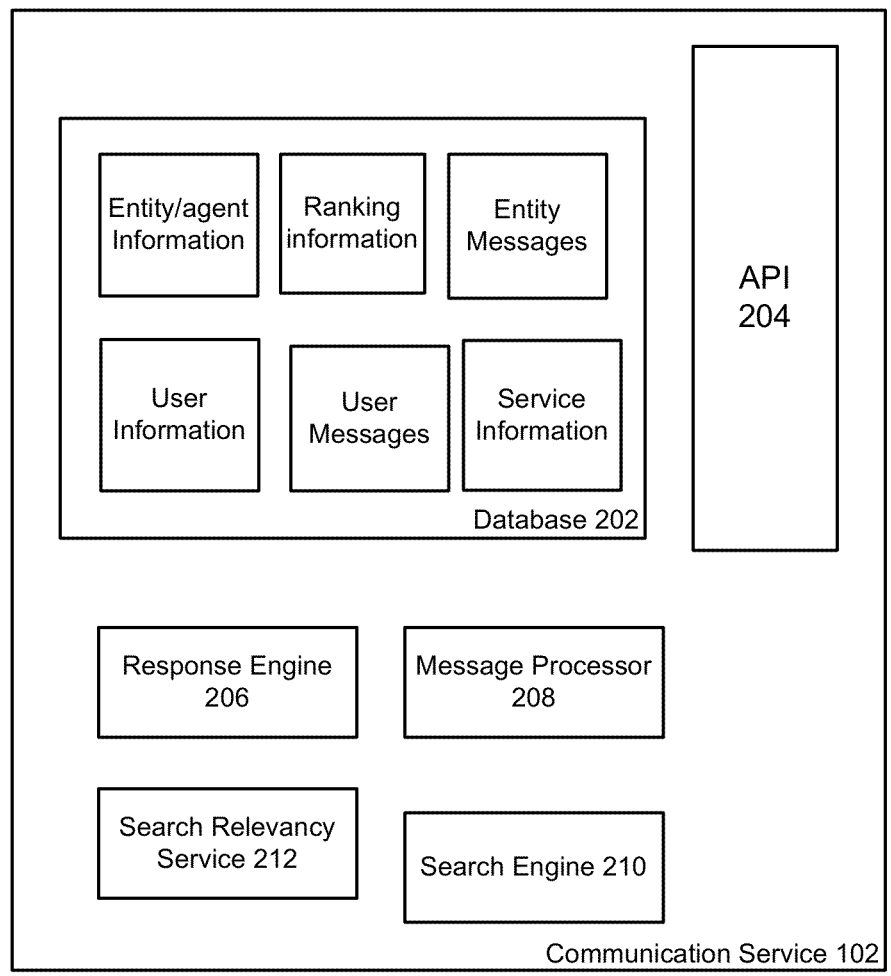
FIG. 2 is a block diagram of one example of a communication service, according to one embodiment of the present invention.

FIG. 2 shows an example of the communication service 102 according to various aspects of the present invention. In one example, the communication service 102 includes a database 202, an Application Programming Interface (API) 204, a response engine 206, a message processor 208, a search engine 210, and a search relevancy service 212. The communication service 102 may be implemented as a cloud-based computing platform, such as the EC2 platform, available from Amazon.com, Seattle, Wash. However, it should be appreciated that other platforms and cloud-based computing services may be used.

The API 204 can serve as an interface between the communication service 102 and various software programs and interfaces and further facilitate their interaction. In one example, the API 204 can interface components of the communication service 102 and the applications and software programs used by the devices 104, the entities 116, and/or the call center 112. The API 204 can include one or more discrete interfaces, for example, a user interface for interacting with the personal interface, an entity interface for interacting with one or more entities, and a service interface for interacting with the call center 112. The communication service 102 can further provide one or more related services through the API 204, for example, the search relevancy service 212, a service for federating web chats, a service for brokering web chats, and a service for determining user presence in a brokered web chat, among other services.

The search relevancy service 212 or any other services can be provided to third party systems that are configured to receiving these services. These third party systems can be further configured to work integrally with the communication service. For instance, a daily coupon provider can integrate a communications interface into one or more applications or services offered by the coupon provider. Through this communications interface, the daily coupon can provide services or information offered by the communication service 102. Various techniques and protocols for communicating information may be used without departing from the scope of the examples disclosed herein.

In one example, a button may be placed on a website showing the coupon, that when selected by a user, initiates a communication, for example a chat session, with a business regarding the coupon item. This communication can allow the user to obtain information from the business about the coupon item, schedule appointments with the business, or provide feedback to the business.

In another example, a hotel search website can integrate a communications interface into one or more applications or services offered by the hotel search website. For example, a button may be placed on the hotel search website, that when selected by a user, initiates a communication, for example a chat session, with a hotel. This communication can allow the user, for example, to obtain information from the hotel about the hotel property, make reservations for services provided by the hotel, or to provide feedback to the hotel.

The communication service 102 can be capable of storing information in the database 202, for instance, relating to individual users, entities, agents and the call center. The user information can comprise of, for example, user identification, any history information, such as, entities previously contacted, messages previously transmitted and received, locations previously visited, devices associated with the users, and comments publically provided, among other user information.

The communication service 102 can be further capable of storing entity related information in the database 202, for example, communication channels (phone numbers, text channels, email channels, web-chat systems, etc), preferred order of communication channels, organizational information for the entity (departments, subsidiaries, associated companies), associated agents of the entity, authority associated with the agents, location information for the entity, description of the entity, ranking information associated with the entity, previously transmitted communications, and any provided form responses, among other entity information.

The communication service 102 can be further capable of storing agent information, which can comprise of, for example, agent identification, agent status (available or unavailable), agent description, agent category (or job title), devices associated with the agent, previous messages from the agent, location information of the agent, authority level of the agent, among other agent information.

The communication service 102 can be further capable of generating and storing ranking information in the database 202. The ranking information, in various examples, may be provided as part of a search relevancy services described below with reference to FIG. 3. Ranking information based on responsiveness may also be used alone or in combination with other parameters to determine an order of the list of entities presented to the user. For example, other parameters can include proximity, communication quality, and presence of the entity in an online chat system, customer loyalty and repeat customer rate. These parameters alone or in combination with each other and/or other criteria can be used to order search results.

User or entity presence can be provided to the user 114 through a variety of methods, including depictions of online presence in the body of a chat, in discussion history, or in search results. Displaying chat presence in search results themselves can be of particular note, as it may be beneficial to provide information within the personal interface that indicates an availability of an individual representing an abstract entity within results of the online search. In one embodiment, it may be useful to use availability information to influence an order of a result set from the online search, either alone or in combination with other criteria.

The communication service 102 can be further capable of storing call center information in the database 202, for example, call center agent identification, call center agent status, call center agent description, call center agent category, previous messages from the call center, location information of the call center agent, among other call center information. The communication service 102 can be further capable of storing additional values relating to messages from entities, the call center 112 or from users 114. For example, values can include time and date information, as well as response time to the message. In addition, messages can be correlated to each other and to other related or competing entities.

The users 114 may enter one or more search parameters into the personal interface 110 of the devices 104 to locate entities. The search engine 210 can receive search parameters from the devices 104 and provide search results based on the criteria set by the search parameters. The search results can be displayed to the users 114 on the devices 104 via the personal interface 110. The search engine 210 may be capable of accepting one or more search parameters such as keywords, location information, categories and provide a list of entities matching the search parameters. In one instance, the search engine 210 can provide the search results based on rank information associated with the entity. In one example, the search engine 210 is a third party service located outside of the communication service 102. The communication service 102 can submit the search parameters and receive the search results through the API 204. Commercially-available searching systems and algorithms may be suitable for implementing various aspects of the search engine 210.

According to various examples, when a message is received from the user 114 via the personal interface 110, the message is analyzed and processed by the message processor 208. The message processor 208 can receive one or more messages from one of the devices 104 and determine how to process and respond to the messages. The message processor 208 can make this determination based on any information, including the message content, entity information, and user information. To make this determination, the message processor 208 can first decode the message. Second, the message processor 208 can extract entity information, inquiry information and any other relevant information from the message. Third, the message processor 208 can determine one or more response paths including one or more response steps.

In one example, the message processor 208 can perform the functions to decode the contents of the message using one or more parsing methods, for example, various natural language understanding analyses. Such analyses can include, lexicon components, syntactic or semantic analyses, keyword mapping can be preformed. Various methods of deriving meaning from the context can also be used, for example, semantics, and pragmatic analyses, among other methods. In some examples, commercially-available systems of parsing and decoding may be suitable for implementing various aspects of the message processor 208.

The message processor 208 can translate the message into the language of the receiving entity. Upon receiving the reply from the entity, the message processor 208 can also translate the response into the language of the user. This method of brokering messages can allow any non-native speaking user to communicate with any entity. For instance, in one implementation, the message processor 208 can use a translation service provided by a third party, such as Google Translate available from Google, Inc, Mountain View, Calif.

As described in one example above, the users 114 can send a message, without first conducting a search, referencing one or more entities 116 or generally referring to an entity category. In one example, the message processor 208 can interact with the search engine 210 to determine the entity information from the message. As such, the message processor 208 can decode the entity information from the message and communicate the entity information to the search engine 210. The search engine 210 can return the list of entities matching the entity information in the message to the message processor 208. Alternatively, the general message can be transmitted to the call center 112 to handle the response.

Once the message is processed, the message processor 208 can determine how to respond to the inquiries contained in the message, including determining a response communication channel. Also, the message processor 208 can determine one or more response steps including one or more communication channels. The response steps can be determined based on a preprogrammed set of rules. In one implementation, the response communication channels can include a direct communication channel, an auto-generated communication channel, a call center communication channel, as well as other communication channels. The response communication channels can also include a combination of communication channels.

According to one embodiment, the direct communication channel can include forwarding the message directly to one or more entities 116, as described below with reference to FIG. 4. In one example, the direct communication channel is chosen when the user first performs a search indicating a particular entity, and the entity is configured to receive messages directly from the user. The message processor 208 can also determine through which communication channel the message should be forwarded. In one example implementation, the entity may have multiple communication channels defined that are able to receive messages, such as, the entity interface, phone, email, web-chat, SMS, among others. The message processor 208 can determine which of the entity communication channels to use based on entity preferences, responsiveness associated with any of the channels or any predetermined rules, or information.

In one example, an auto-generated communication channel can include generating the response by communication service 102 based on responses accessible from the database. Such information may be obtained from publically and privately available databases and/or third party services. In one implementation, the message processor 208 can determine whether the response can be generated by the response engine 206 and processes the message accordingly. For example, the response engine 206 can generate a response from information relating to directions, open hours, addresses, store locations, as well as any other information stored in the database 202.

In one example, the entity may provide token responses designed to respond to frequently requested information. For example, the entity can provide token responses to proposed legislation, ongoing litigation, pending investigations, future product releases, store openings and other frequently occurring inquiries. The communication service 102 can also communicate with a service provided by the entities or third parties to generate the response. For example, third party services can provide movie times, restaurant reservations and entity services can provide inventory lists and other services provided by entities and third parties.

The call center communication channel can include forwarding the message to the call center 112, which can obtain one or more responses to the message. In one embodiment, the call center 112 may function as a personal assistant to obtain the requested information from one or more entities regardless of the communication channels available to the user and provided by the entity. The call center can essentially interject itself into the communication path and broker the communication between two distinct platforms. For example, the user may send a text or instant message to the entity. In this example, even if the entity is not configured to receive these types of messages, the call center can relay the message to the entity using another communication channel used by the entity, for example phone. The call center can obtain a response from the entity through the phone and then provide the information back to the user using text or instant message.

Call center agents can view and manage the received messages via the call center interface 118. The call center agents can obtain contact information for one or more entities from the database 202, including the entity's available and preferred communication channels. Once the contact information is obtained, the call center agents can contact the entity to obtain a response. The response message can then be transmitted back to the call center 112. In one example, the call center 112 transmits the response to the communication service 102, which can transmit the response to the user on one of the devices.

The call center interface 118 can display a listing of all received inquiries from the communication service 102. In one example, the call center interface 118 can include a predetermined workflow that may further include multiple steps between receiving the message to transmitting the response to the user. For example, in one or more of the steps the call center can determine if the message is valid (not spam, duplicative, harassing, or profane), whether the message contains the requisite information to obtain a response (entity information, specific details), whether a response request has been initiated, whether a response has been received, and whether the request needs to be escalated. Any other steps can be included in the workflow, and the implementation is not limited to any particular order of performing these steps. The call center can also send messages to the user to update them on the status of the response, or to obtain addition information.

In one example, the communications between the users 114 and the entities 116 include a single inquiry from the user and a single response from one or more entities. In another example, there can be multiple communications between the users and the entities. In one embodiment, these communications can form an interrupted chat system with messages transmitted back and forth and a delay between the communications. In another embodiment, the communications can be transmitted in real-time, generating an instantaneous and long-lived chat between the user 114 and the entity 116.

In one example, if the entities are able to communicate via specific web chat system, the messages can be configured to be transmitted directly to those systems. In this instance, the communication service 102 can function as a chat brokering system and the messages can be configured to a format accepted by the chat system. The format can be any such format typically used by the chat system as well as the user, for example, instant messaging, email, SMS, plain text or any system's propriety format.

After receiving a response from the call center, from one or more entities, or by to auto-generating the response by the response engine 206, the response can be changed into the format accepted by the requesting device. The response can then transmitted to the user 114 via one of the devices 104 and displayed to the user 114 via the personal interface 110.

Search Relevancy Service

The search relevancy service 212, included in the communication service 102, determines rank information for entities based on the entity's responsiveness to past user queries, and orders user's search results based on the rank information. The ordered results based on the rank information allow the user to quickly initiate communication with the entity and obtain needed information from the entity. The ordered results further allow the user to make decisions about which entity to contact based on the rank associated with the entity and therefore potentially obtain a faster response from the most responsive entity. As a result, ordering entity searches based on ranking information encourages entities to respond more quickly to messages from the users 114 to move them up in the order of entities. In addition, because the ranking information can be displayed next to the entity information, entities may be encouraged to respond to improve their poor ranking.

Figure 3:
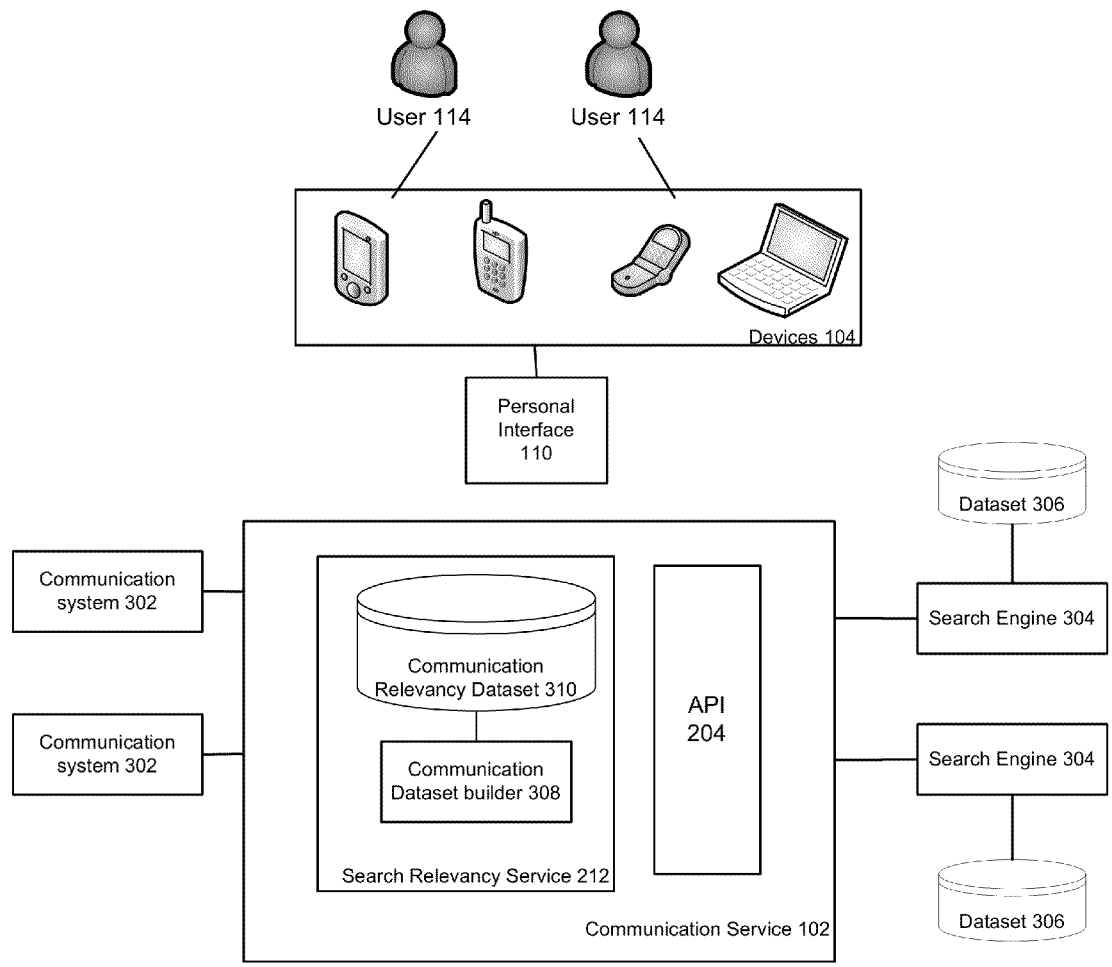
FIG. 3 is a block diagram of one example of a search relevancy service, according to one embodiment of the present invention.

FIG. 3 shows an example the search relevancy service 212, which communicates with the users 114, via the personal interface 110 on the devices 104, one or more communications systems 302, and search engines 304, including their respective datasets 306. The search relevancy service 212 may monitor communications between the users 114 and the communication service 102 or other communication systems 302 and provide the most relevant search results to the users. The search relevancy service 212 includes a communication dataset builder 308, and a communication dataset 310. The API 204 can serve as an interface between the search relevancy service 212 and various software programs and interfaces and further facilitate their interaction. In one example, the API 204 can provide an interface between the components of the communication systems 302, the personal interface 110, the search engines 304 and any third party systems or applications.

As shown the search relevancy service 212 is included in the communication service 102. However, the search relevancy service 212 may be a discrete service disposed outside of the communication service 102. In addition, the search relevancy service 212 may communicate with other communication system 302. However, the communication systems can be any communication system, such as, a voice communication network, a video communication network, a SMS or MMS based communication network, an email based communication network, an instant messaging based communication network, a social Web communication network, or a micro-blog communication network. Furthermore, commercially-available communication systems or components may be suitable for incorporating various aspects of the communication system.

In one example, the communication dataset builder 308 monitors the communication systems 302 or communication service 102 to create a communication relevancy dataset 310 based on communications between users and entities responding to the users. The communication dataset builder 308 can retrieve implicit or explicit communication metadata from one or more communication systems and/or the users 114. The implicit metadata can include objective information or metrics pertaining to communications between user and entity, while explicit metadata can include subjective information or metrics pertaining to communications between user and entity.

The implicit metadata can include a number of attempts to communicate with an entity, the related number of instances of successful communication, instances of unsuccessful attempts to communicate with that entity, whether the entity is currently available for a web-chat, as well as other implicit metadata associated with entity communications. In addition, the implicit information may include a length of time of the successful communication. Implicit metadata can further include a number of repeat instances of communication between the person and the same entity. However, other observable aspects of the communication system and communications between users can be used to determine implicit metadata.

In some examples, the communication dataset builder 308 can use implicit metadata can determine a responsiveness metric associated with the communications. For example, implicit metadata can include the response time associated with a successful attempt to communicate with an entity. The communication dataset builder 308 can use the response time associated with successful attempts to communicate to create a metric of responsiveness of a particular entity. In one example, the faster the response from a given entity may be associated with the higher the responsiveness metric.

The implicit metadata can also include a measure of the quality of the communicated information (e.g. how response was the entity) in a successful communication instance. For example, a user inquiring about an item in stock in a store, may receive a terse response indicating whether the item is in stock, or may receive an elaborate response including the item, a description of the item, or items of comparable quality. In this example, the more elaborate response may receive a higher quality metric. The communication dataset builder 308 can use various factors, such as the number of words, or the number of messages between user and entity, to determine the quality metric.

In other examples, the communication dataset builder 308 can also obtain explicit metadata from the communication between the users 114 and the communication service 102 or communication systems 302. In one example, the explicit metadata includes user generated subjective rating of the communication between the user and the communication 102 or communication systems 302. For example, explicit metadata can include a degree of satisfaction with the communication, level of quality of the communication, level of responsiveness to the user, among other metrics. The explicit metadata can be an enumerated value that can be generated from the ratings and values.

In one example, the one or more users 114 enter a query for the purposes of finding one or more entities with which to communicate. The query may be entered into one of the devices 104, such as a cell phone, a smart phone, a PDA, a tablet computer, laptop computer, desktop computer or other device or system. The user 114 may interact with the devices 104 using the personal interface 110 provided on one of the devices 104. As described above, the interface may allow for inputs using keyword searches, geographical map searches and inputs, location based searching (e.g. within 2 mile radius of the present location), category selections (such as "restaurants"), and other methods of inputting search parameters.

The search relevancy service 212 can include one or more components that can process and analyze the query to determine information from the query. In one example, the search relevancy service 212 can perform additional functions to decode the contents of the query and determine contents included in the query using one or more parsing methods, for example, various natural language understanding analyses. Such analyses can include, lexicon components, syntactic or semantic analyses, keyword mapping can be preformed. Various methods of deriving meaning from the context can also be used, for example, naive semantics, and pragmatic analyses, among other methods. In some examples, commercially-available systems of parsing and decoding may be suitable for implementing various aspects of the search relevancy service.

In one example, the information extracted from the query can include user identification, entity information regarding the entity the user is attempting to contact, entity category if included in the query, location information, any field limitations selected by the user, among other information. In addition, the search relevancy can obtain information stored on the user's device, such as device information, location information, and previous communication information. This information can be stored in the database and correlated with the user, as well as with the search.

The query, including the searching parameters, can be transmitted from the device 106 to search relevancy service 212. Using the received query, the search relevancy service 212 obtains search results from one of the search engines 304. The search engine 304 can retrieve search parameters from the query and provide search results based on the criteria set by the search parameters. The search engine 304 may search Web pages, place pages, or obtain information from public or private databases or third party application services. The search engine 304 can then provide search results to the search relevancy service 212 that can include a list of entities matching the search parameters. In addition, the search engine 304 can also return various communication channels associated with the entities. For example, local entity phone number and email address, and/or corporate entities customer service phone number, email address, and/or web-chat system.

The search engine 304 can include its own dataset 306, which can be used to rank the search results obtained by the search engine 304 before providing the results to the search relevancy service 212. In one example, the search engine dataset 306 can be determined using various factors, such as popularity of similar searches performed by other users, user's location, previous searches performed by that particular user, "freshness" of the search results (short term popularity), as well as, marketing techniques for ranking results. The dataset 306 can be separately provided to the search relevancy service 212 in conjunction with the search results. Commercially-available searching systems and algorithms may be suitable for implementing various aspects of the search engine.

In one example, the communication dataset builder 308 uses both the explicit and the implicit metadata to generate the communication dataset 310. The communication dataset builder 308 can use one or more algorithms or methods for generating the communications dataset 310. In one example, the metadata is assigned a weight value based on type of metadata and the importance of it in determining the relevancy of the results to the user. The communication dataset 310 can be stored in the database 202. The communication dataset builder 308 can link the communication dataset 310 to the search results obtained from the search engine 304. The linking of communications dataset with the search results can be accomplished using any methods of data matching or data linking, for example, by entity name.

The communication dataset 310 is then used to rank the search results from the search engine. In one example, the rank is based on relevancy of the search results to the user that is seeking to initiate communication with the entity. The search results can then be ordered from most relevant to least relevant to least relevant to the user 114. In addition, the communication dataset can also rank any communication channels returned with the search results. For example, an entity's local phone number can be ranked first, as the communications channel associated with a higher relevancy, followed by an email address, with a lower ranking.

In one example, ranking of the search results can be determined based on the communication dataset, as well as one ore more methods or algorithms. For example, one ranking method can determine relevancy as a function of proximity, responsiveness and repeat customer rate. In this example, proximity is a function of distance between users current location and the entity location. In addition, proximity can also be based on the user's willingness to travel to a more distant location. Responsiveness, in this example, is a function of the delay between the initiation of communication and the entity response. Repeat customer rate can be a function of customer loyalty, the total number of repeat communications between users and the entity, as well as, the tendency of a consumer to maintain relationship with the entity. It can be appreciated that other methods of ranking search results can be used.

Ranking methods can be combined together with the dataset 306 obtained from the search engine 304. For example, if the user is searching for "Senator," popularity based to methods indicate that users are typically looking for their state senator, rather than for their local senator. In this example, location information indicates which location is most relevant to the user, and that state's senator is considered most relevant. Search results can return multiple channels for contacting the senator, for example, email, phone number for the office, or phone numbers of various staff members. The communication dataset for the senator's various communication channels can rank a particular staff member's email as most relevant, whereas, the main office phone number as least relevant. The staff member's email can be listed above other channels in the search results. Other less relevant results would be listed subsequently, for example, local senators of the user's state and can be followed by state senators of neighboring states.

The communication dataset builder 308 can then provide the ordered relevancy results to the user 114 via one of the devices 104. The ranking information can be displayed along with any entity information, allowing the user 114 to make decisions about the entities listed in the results based on the ranking information. It is appreciated that users may be more inclined to initiate contact with entities higher on the results list and those showing a high ranking level. The results can also indicate whether the entity is currently available for a web-chat.

The search relevancy service 212 can be capable of storing additional information in the database 202, for instance, information relating to individual users, entities, communication system, any searches performed by one or more users, the search results returned from those users, and the correlation to subsequent communication based on the order of result on the search list. The search relevancy service 212 can be further capable of storing any ranking information determined as the result of reordering the search results. Any subsequent queries or communications with the communication system can increase or decrease the ranking values.

The search relevancy service 212 can provide access to the communication relevancy dataset 310 to third parties that wish to use it to modify their services to include the search relevancy information. These third parties can access the dataset 310 through the API 204. For example, service and application providers of review websites, (restaurant or travel) can use the communication relevancy dataset 310 to provide search results to their users. Users may base their decisions to dine or to travel based on whether the users can initiate communications with the hotel or restaurant.

Figure 4:
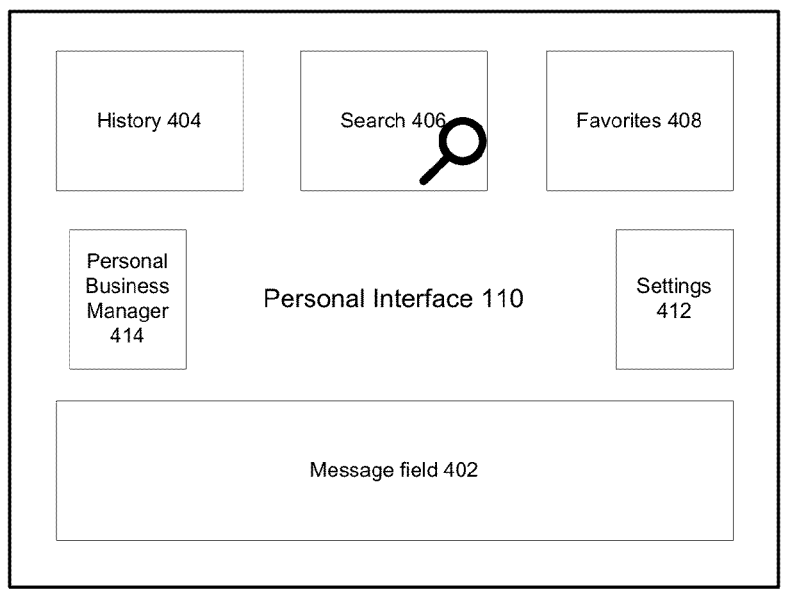
FIG. 4 is a block diagram of one example of a personal interface according to one embodiment of the present invention.

FIG. 4 shows an example of the personal interface 110 according to various aspects of the present invention. As described above, the personal interface 110 can allow users 114 to conduct searches for entities, view information about entities and communicate with the entities without first locating contact information. As shown in FIG. 4, the personal interface can include a message field 402, a history option 404, a search option 406, favorites 408, settings 412, and a personal business manager 414.

In some examples, the device 204 may not support a graphical personal interface. In this instance, the communication to and from the user can be provided via a messaging application supported by the device, for example SMS text or email messaging application. In one example, the user can register the device with the communication service to provide user communications through that specific device using the messaging application supported by the device. For example, by registering the user's mobile phone, the communication service can send SMS text messages to the user's mobile phone every time a response from the entity is send to the user. In this example, the user can view the SMS text message in the SMS application available on the user's phone.

The user can enter the message into the message field 402 and provide entity information in the message field. Alternatively, the user can first search for the entity by selecting the search option 406. By selecting the settings option, the user can change personal preferences, communication settings, manage the user's account, and associate one or more devices with the users account, among other options. By selecting the history option 404, the personal interface can display to the user previous communications between the user and any entity.

The search option 406 can further provide a list of communication channels for the entity. The communication channels can also be ordered in the list of results based on a ranking associated with that channel. The user can choose to direct the message to one or more of the communication channels. For example, a hotel can have a concierge channel, a front desk channel, a corporate channel, and/or an event planning channel, among other channels. In this example, a guest staying at the hotel can choose to direct the message to the front desk channel or the concierge channel, while a person inquiring about organizing an event can direct the message to the event planning channel. By directing the message to different channels the user may be able to more speedily reach the appropriate agent of to the entity to obtain the needed response.

The personal interface 110 can also include a personal business manager 414. The personal business manager 414 can function as a central conduit for communications and contact information by maintaining any information that relates to communication with an entity. Personal business manager can maintain and manage a list of entities the user previously contacted and set them up as favorites for easy communication. Each entity can have a user managed profile and can include entity information, such as contact and location-based information.

Personal business manager 414 can maintain a history of communications with those entities that can allow the user to provide confirmation of any entity assurances, guarantees, or agreements and store them for future reference. The personal manager can import business contacts from a contacts database on the device. The personal manager may also automatically store any entity information received as a result of any communication with that entity.

The personal business manager 414 can further provide an input for the user to record notes and set up reminders. Each entity entry can have additional fields, such as, account numbers, frequent flyer numbers, pins, passwords, order numbers, as well as other entity related information. The personal business manager can allow the user to quickly provide the entity related information during communications with the entity.

The personal interface 110 can also include a method of providing a common input form that is agnostic to underlying transactional systems and eliminate disparate forms used by different entities. Any information typically requested from the user, as a predefined set of prompts may be included in the structured information. Structured information can include, for example, tracking information, appointment information, reservation information, taxi dispatch information and any other information. For example, if the user is interested in requesting a taxi, the structured information can include, date, time, starting location, destination location, contact name and number for the person, type of taxi, and the number of passengers.

The method of providing the common input form can include a way to enter the structured information via the personal interface 110. In one example, the personal interface 110 can request the needed information from the user, for example in the form of a series of leading questions communicated to the user. In another example, the method may auto-fill the structured form information from the information stored in the device or any other location that may store the structured information, for example, user location, name or contact number. If any structured form information is missing from the user input, a follow-up request can prompt the user to enter the missing structured form information. It should be appreciated that any method of obtaining information can be used to obtain the structured information. In one example, the structured form information received by the communication service can be provided to another service, such as a restaurant reservation service. In another example, the structured form information can be provided directly to the entity using any of the entity's provided communication channels.

Figure 5:
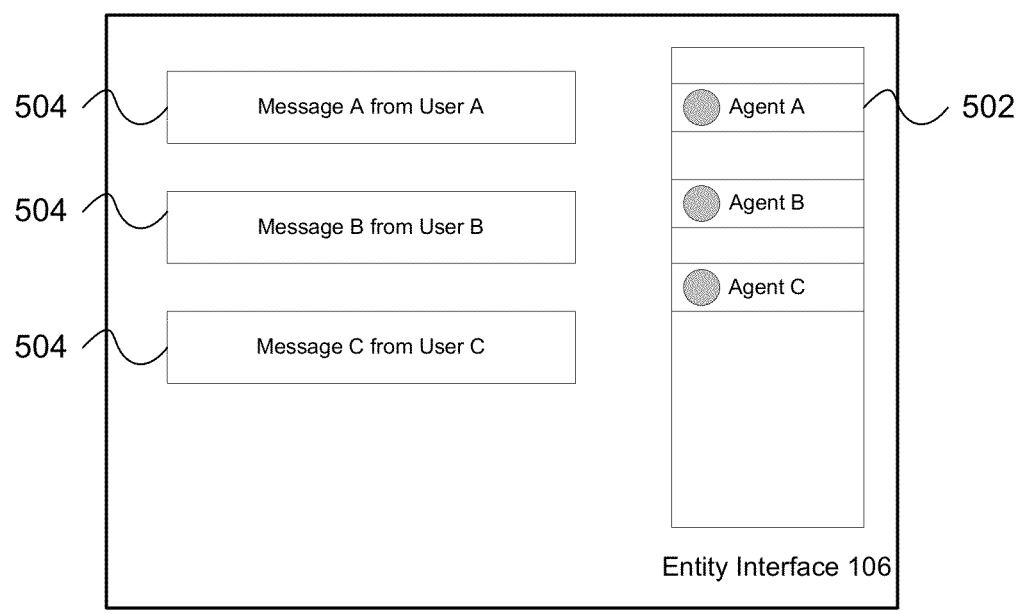
FIG. 5 is a block diagram of one example of an entity interface according to one embodiment of the present invention.

FIG. 5 shows an example of the entity interface 106 according to various aspects of the present invention. In one example, the communication service 102, via the entity interface 106, allows the entities to seamlessly communicate with the users 114 as single virtual entities. People communicating on the entity's behalf are designated as agents 108 of the entity. The agents may be employees of the entity, independent contractors, third party employees, or individual users with authority to speak for the entity. The communication service 102, through the entity interface 106, can maintain a relationship between the entities 116 and the agents 108 that are able to represent the entities in communications with users 114. Each agent of the entity can choose to participate in any ongoing or new discussions via the entity interface 106.

To participate in the discussions, the entity interface 106 can display a list of all agents 502 that are available at any given time and able to participate in the discussion. The entity interface 106 can also display to each agent the messages 504 from the users 114 to the communication service 102 and any entity responses to the users 114. The entity interface 106 can display communications from the viewing agent or it can display communications from any other agent representing the entity.

As described above, when responding to the users, the agents 108 can appear as a single virtual entity for the user in the in the personal interface 110. Alternatively, the user 114 can receive an indication that the response was provided by a particular agent on behalf of the entity. The user 114 can also choose to direct subsequent communications to that particular agent.

Agents 108 can communicate with the users 114 through via the entity interface 106 on the devices 104. If the device 104 is a mobile device, agents 108 can respond to to messages and requests as part of their other duties and do not need to use a dedicated computer system. For example, the agents 108 can be sales representatives in a store that can perform other duties, such as managing the sale floor.

In some examples, the device 204 may not support a graphical entity interface. In this instance, the communication to and from the agent 108 can be provided via a messaging application supported by the device, for example SMS text or email messaging applications. In one example, the agent can register the phone with the communication service to provide user communications through that specific device using the messaging application supported on the device. For example, by registering the agent's mobile phone, the communication service can send SMS text messages to the agent's mobile phone every time a message from a user is sent to the entity. In this example, the agent can view the SMS text message in the SMS application available on the agent's phone.

One or more agents 108 can be authorized to speak for the entity 116. In turn, the entity 116 can manage that authority given to the agent, including removing authority from the agent via the entity interface. In turn, various users can request authority to speak for the entity. For example, there may be a passionate community of people (e.g. fans, volunteers, or alumni) who may wish to speak on behalf of an organization. In this example, if the organization desired such communication, it can approve the user's authority within the entity interface.

The entity interface 106 can further provide for the entity or the communication service to authenticate the agents or users before granting authority to speak on behalf of the entity. In some examples, the entity interface can provide the entity to select a method of authentication. The methods of authentication can include verification through a communication channel. For example, requesting that the agent or user provide an email, a phone number, a website, matching the entity information and contacting the user or agent at that phone number, email or through the website.

Further, the authority given to the agents 108 can include one or more authority levels. These authority levels can allow the agent to invite and validate other agents or agents to speak on behalf of the entity. These authority levels can also limit the ability of the agent to respond to certain types of inquiries. In one example, the authority level can correspond to the job description of the agent. For example, ability to issue refunds necessitates a high authority level.

Agents 108 can establish themselves as available to communication in the entity interface. Agents 108 that are available and have the authority to respond are indicated as such in the entity interface 106 and messages can then be sent to the agents 108 on their respective devices. Similarly, agents 108 that are unavailable are visually indicated as such in the entity interface 106 and messages are no longer sent to those agents 108 on their respective devices.

If one or more agents are available to represent the entity 116, then the entity 116 can appear "online" to the user in the personal user interface 110. If the entity is online, real-time online chats can be generated between the user 114 and the entity 116, represented by the agents 108, as soon as the user 114 receives the search results from the communication service. Conversely, if no agents 108 are available to represent the entity 116, then the entity 116 can appear as "offline" to the user in the personal user interface 110 and the user may be able to establish the real-time chat.

The entity interface 106 can further provide a back channel of communication for the agents 108. The agents 108 can use this back channel to discuss user communications and determine appropriate responses. The communication in the back channel can be transparent to the individual user.

The entity interface 106 can provide for one or more agents with authority to input and edit information regarding the entity, including communication information. The entity interface can further allow one or more agents to enter information that can be auto-generated by the communication service, including any token responses. The entity interface 106 can also allow one or more agents with authority to set up various communication channels, for example phone, email, web-chat, SMS, among others. The entity interface 106 can allow one or more agents to set preferences for each communications channel. By setting preferences, the communication service can determine through to which communication channel the message should be forwarded.

Computer System

As discussed above with regard to FIGS. 1-5, various aspects and functions may be implemented as specialized hardware or software executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 6:
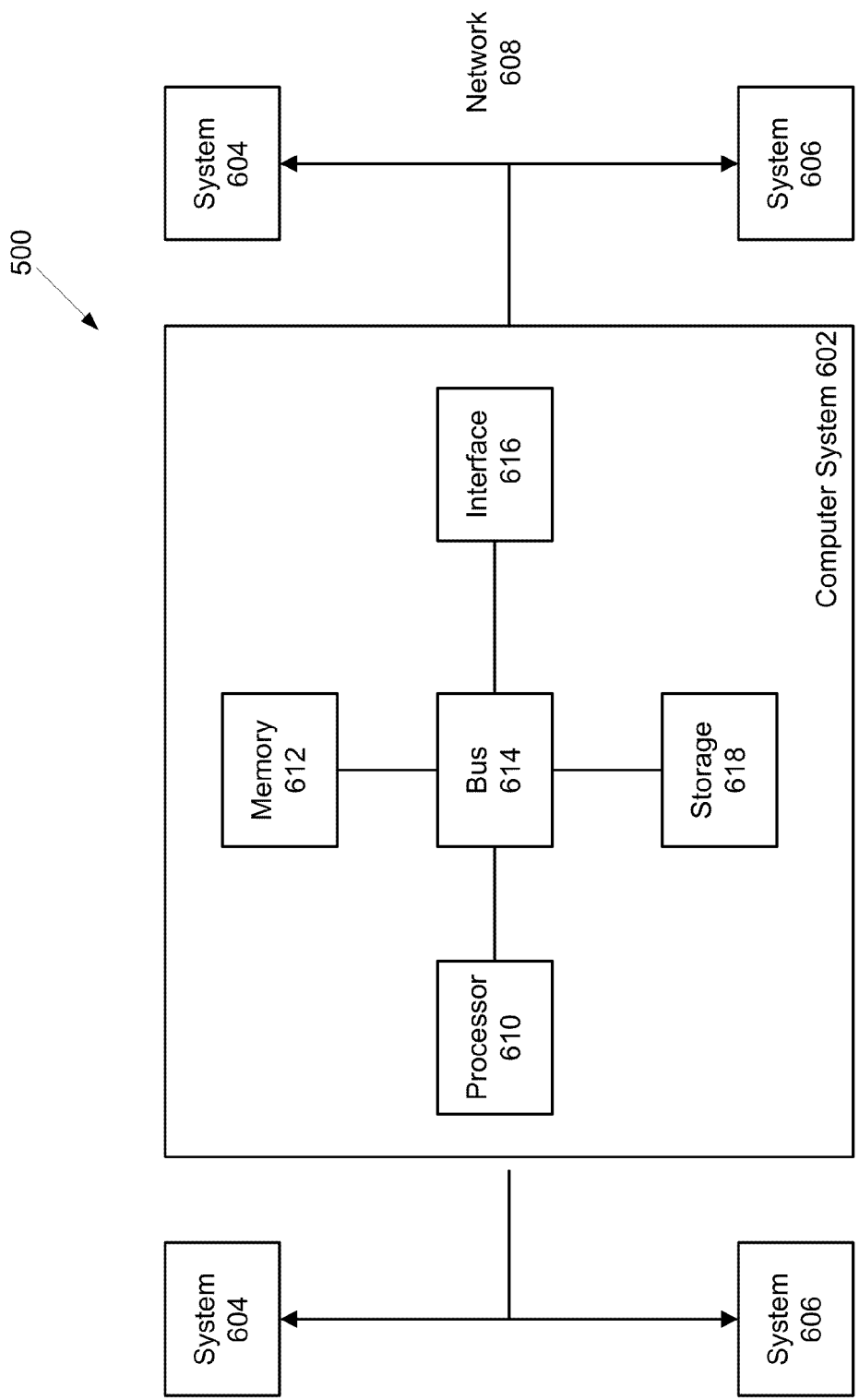
FIG. 6 is a block diagram of one example of a computer system that may be used to perform processes and functions disclosed herein.

Referring to FIG. 6, there is illustrated a block diagram of a distributed computer system 6600, in which various aspects and functions may be practiced. The distributed computer system 600 may include one more computer systems that exchange (i.e. send or receive) information. For example, as illustrated, the distributed computer system 600 includes computer systems 602, 604 and 606. As shown, the computer systems 602, 604 and 606 are interconnected by, and may exchange data through, a communication network 608. The network 608 may include any communication network through which computer systems may exchange data. To exchange data using the network 608, the computer systems 602, 604 and 606 and the network 608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 602, 604 and 606 may transmit data via the network 608 using a variety of security measures including, for example, TLS, SSL or VPN. While the distributed computer system 600 illustrates three networked computer systems, the to distributed computer system 600 is not so limited and may include any number of computer systems and computing devices, networked using any medium and communication protocol.

As illustrated in FIG. 6, the computer system 602 includes a processor 610, a memory 612, a bus 614, an interface 616 and data storage 618. The processor 610 may perform a series of instructions that result in manipulated data. The processor 610 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 610 is connected to other system components, including one or more memory devices 612, by the bus 614.

The memory 612 may be used for storing programs and data during operation of the computer system 602. Thus, the memory 612 may be a relatively high performance, volatile, random access memory such as a dynamic random access memory (DRAM) or static memory (SRAM). However, the memory 612 may include any device for storing data, such as a disk drive or other non-volatile storage device. Various examples may organize the memory 612 into particularized and, in some cases, unique structures to perform the functions disclosed herein and these data structures may be tailored to store values for particular types of data.

Components of the computer system 602 may be coupled by an interconnection element such as the bus 614. The bus 614 may include one or more physical busses, for example, busses between components that are integrated within a same machine, but may include any communication coupling between system elements including specialized or standard computing bus technologies such as IDE, SCSI, PCI and InfiniBand. Thus, the bus 614 enables communications, such as data and instructions, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and communicate with external organizations, such as users and other systems.

The data storage 618 may include a computer readable and writeable nonvolatile (non-transitory) data storage medium in which instructions are stored that define a program or other object that may be executed by the processor 610. The data storage 618 also may include information that is recorded, on or in, the medium, and this information may be processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller may cause data to be read from the nonvolatile recording medium into another memory, such as the memory 612, that allows for faster access to the information by the processor 610 than does the storage medium included in the data storage 618. The memory may be located in the data storage 618 or in the memory 612, however, the processor 610 may manipulate the data within the memory 612, and then copy the data to the storage medium associated with the data storage 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit (ASIC) tailored to perform a particular operation disclosed herein. While another example may perform the same function using a grid of several general-purpose computing devices running MAC OS System X with to Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 610 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Communication Services Processes

Figure 7:
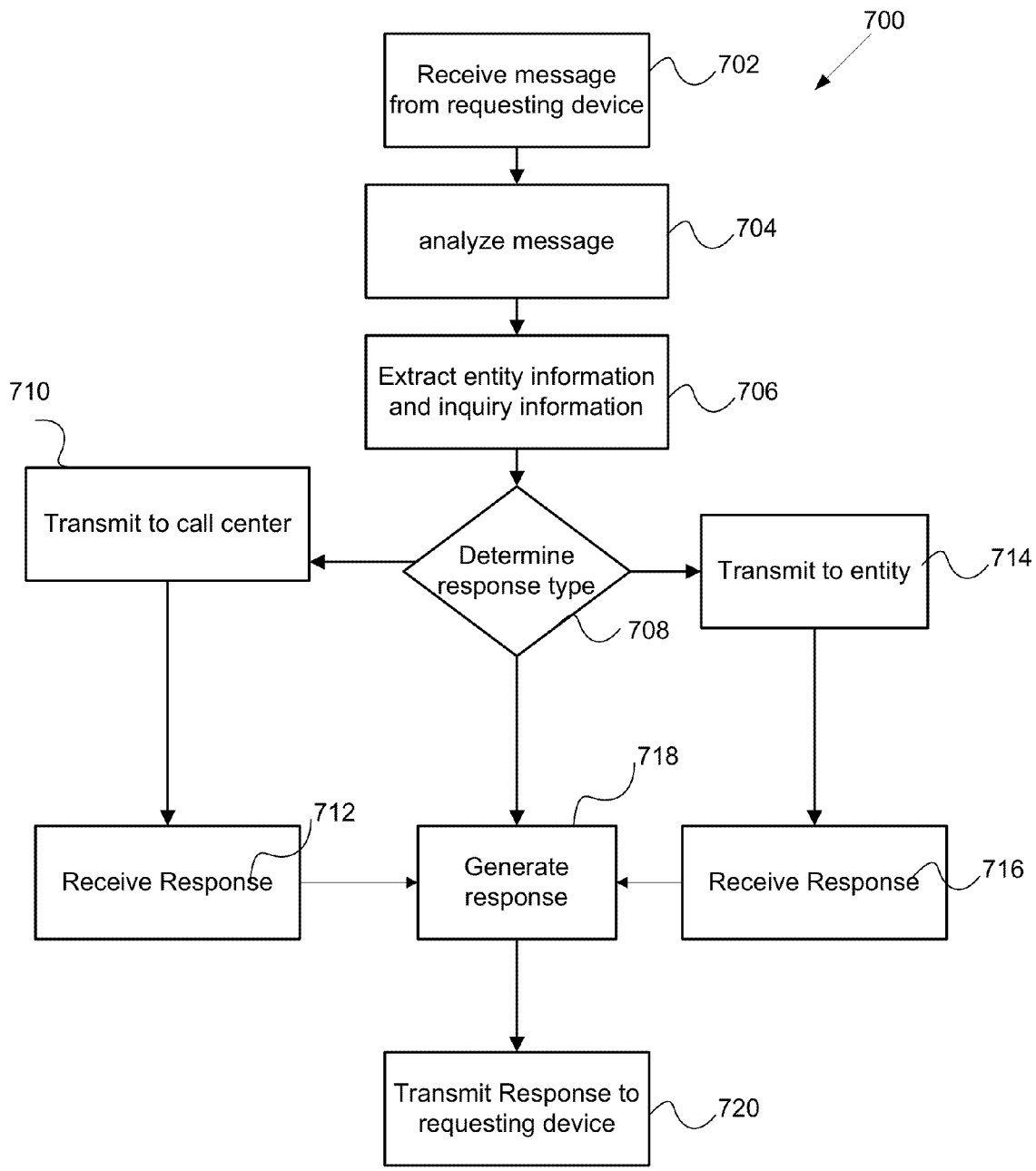
FIG. 7 is a flow diagram of a method for managing and enabling communication of information within the distributed communication system according to one embodiment of the present invention.

An example of the method implemented by the communication service 102 is illustrated in FIG. 7. In this example, the process 700 includes act of receiving a message from a requesting device, parsing and decoding the message, extracting entity information and request information, determining response path, receiving response or generating a response and transmitting the response to the requesting device. Process 700 begins at 702.

In act 702, the communication service receives one or more messages from a requesting device. The messages can be provided to the requesting device by a user. The received messages can be stored in the database, along with any related information, such as user information and device information. In act 704, the received messages can be processed according to various methods, including parsing and decoding the content of the information. In act 706, the entity information and the request information can be extracted from the message by the message processor 208. The entity information and the request information can also be stored in the database. In act 708, response path can be determined based on a preprogrammed set of rules, content of the message and entity information.

In act 710, the request is transmitted to the call center. The call center can obtain a response to the request from one or more entities and transmit the response to the communication service. In act 712, the communication service receives the response from to the call center.

In act 714, the request can be transmitted to one or more entities capable of receiving the request. The response can be provided by an agent of the entity via the entity interface, as described above. In act 716, the communication service can receive the response from the entity. In act 718, the response from the call center 112, the response from the response generator or the response from one or more entities can be generated based on the format accepted by the requesting device. In act 720, the response can be transmitted to the requesting device. Process 700 ends at 720. It can be appreciated that acts 710, 718 or 718 can both be performed or can be performed in the alternative.

Figure 8:
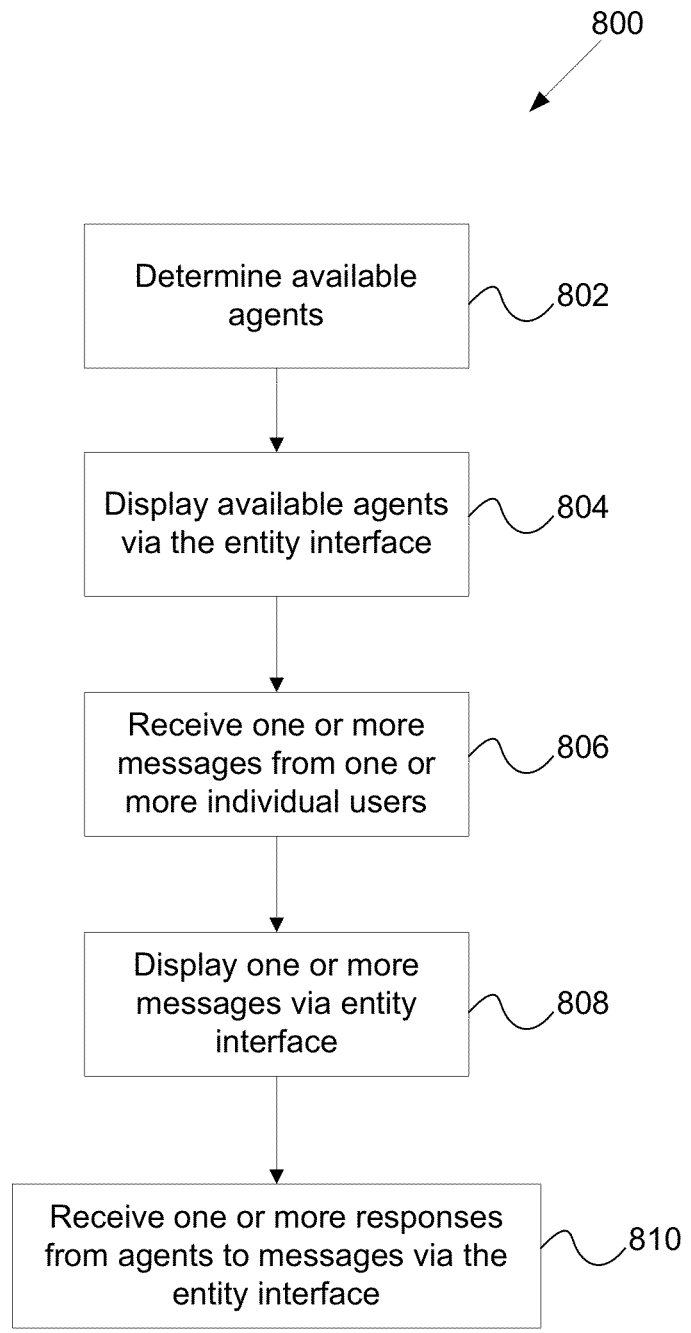
FIG. 8 is a flow diagram of a method for managing and enabling communication of information using the entity interface and the communication service according to one embodiment of the present invention.

Another example of the method implemented by the communication service 102 and the entity interface is illustrated in FIG. 8. In this example, the process 800 includes act of determining available agents via the entity interface, displaying the available agents in the entity interface, receiving one or more requests from individual users, displaying the requests, receiving responses from the agent via the entity interface. Process 800 begins at 802.

In act 802, the communication service via the entity interface receives agent information and determines available agents. In act 804, the available agents are displayed via the entity interface. Agents using the entity interface are able to view all other available agents, active user communications, as well as, previous user communications. In act 806, one or more new messages are received from individual users. In act 808, the new messages are displayed via the entity interface to all available agents. In act 810, agents generate responses to one of the messages via the entity interface. As described above, agents may also communicate with each other via the back channel. Process 800 ends at 810.

Search Relevancy Processes

Figure 9:
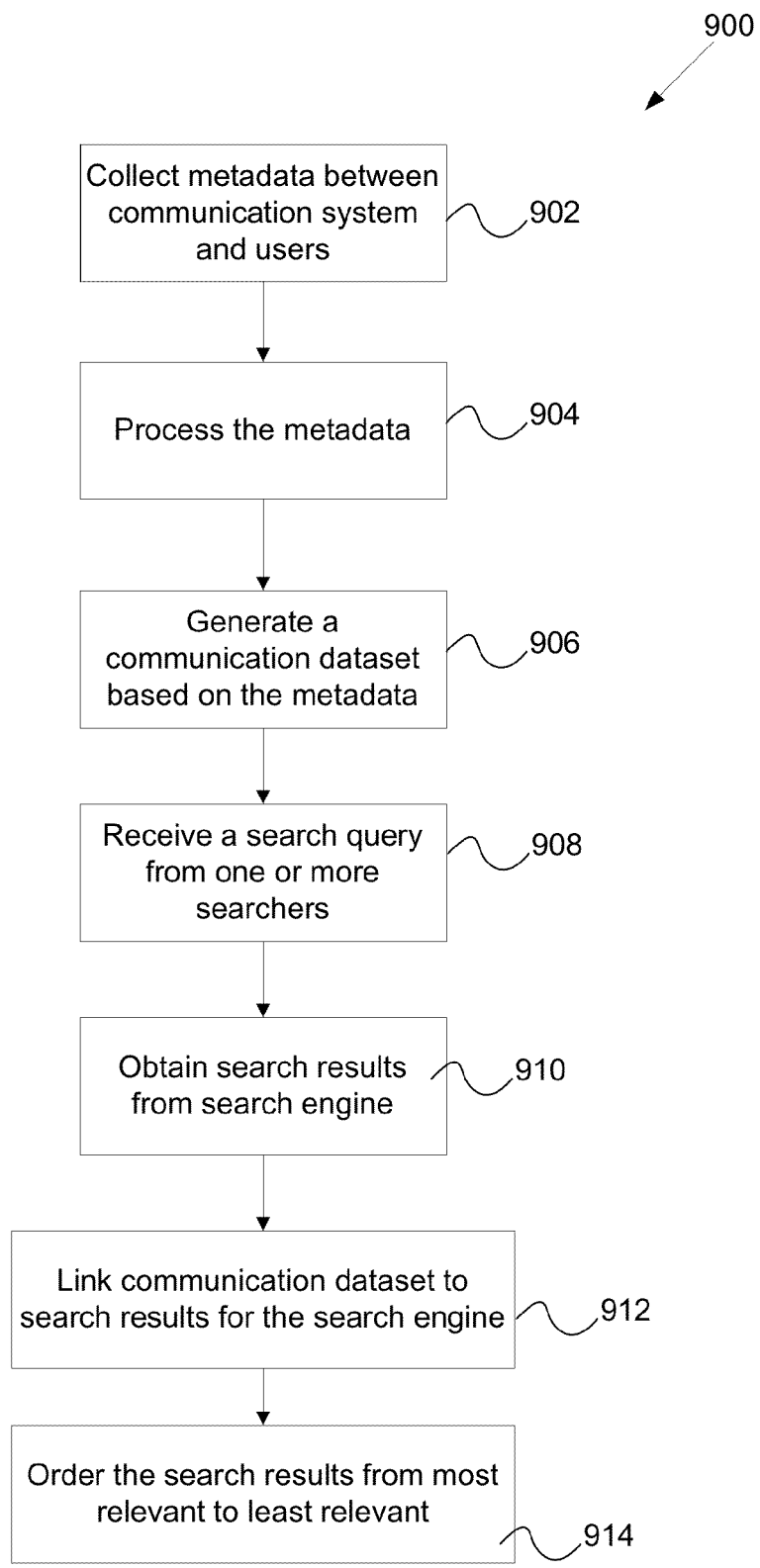
FIG. 9 is a flow diagram of a method for generating search results within the distributed communication system according to one embodiment of the present invention.

An example of the method implemented by the search relevancy service 212 is illustrated in FIG. 9. In this example, the process 900 includes the acts of obtaining metadata, processing metadata, generating a communication dataset, receiving a search query from a user, obtaining search results from a search engine, linking communication dataset to the search results, ordering search results based on the communication dataset. to Process 900 begins at 902.

In act 902, the search relevancy service can obtain and process the metadata from one or more communications systems and one or more users. As described above, the metadata can include both explicit metadata provided by the users and implicit metadata provided by communication systems. The metadata can be assigned a weight value based on its importance in determining relevancy of search results for a user attempting to communication with an entity. In act 904, the communication dataset builder can analyze the metadata. In act 906, communication dataset builder can generate a communication dataset from the metadata. The communication dataset can be stored in a database.

In act 908, the search relevancy service can receive a search query from a user via a device. The search query can including location information, keyword, etc. and may be input into the device using various methods. The search query can include various searching parameters including location limitations, field limitations, specific entity information, and general entity categories, among other search parameters. In act 910, the search relevancy service can obtain search results from one or more search engines. The search engines can search Web pages, place pages, as well as publically and privately available databases and services. The search engines can include one or more datasets that can arrange the search results based on various factors.

In act 912, the search relevancy service can link the communication dataset to the search results. In act 914 the search relevancy service can order the search results based on the communication dataset. The search results can be ordered from most relevant to least relevant to the user attempting to initiate communication with an entity, the most relevant results appearing first in the list. The ordering can be based on ranking information determined from the dataset and based on the metadata collected. Process ends at 914.

Processes 700, 800 and 900 describe one particular sequence of acts in a particular example. The acts included in processes 700, 800 and 900 may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely a computer system configured according to the examples disclosed herein.

Several example features are found in the attached Appendix A, which forms an integral part of the present application and is incorporated herein in its entirety. In particular, Appendix A describes various interface elements that may be used to implement certain functions of the system and method of providing abstract communication.

It should be understood that the various embodiments of the present invention are not limited to each of the embodiments described herein, but rather, various embodiments of the invention may be practiced alone or in combination with other embodiments. Based on the foregoing disclosure, it should be apparent to one of ordinary skill in the art that the embodiments of the present invention are not limited to a particular computer system platform, processor, operating system, network, or communication protocol. Also, it should be apparent that the various embodiments of the present invention are not limited to a specific architecture or programming language.

Having thus described several aspects of at least one example, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. A method for generating relevant search results for a user, the method comprising acts of:
   receiving, by a computer system, a search query related to one or more entities from the user performing a communication initiation search;
   receiving, by the computer system, search results from a search engine based on the search query;
   linking, by the computer system, the search results to a communications dataset generated based on communication metadata received from a communication system, the communication metadata including metrics pertaining to communications between one or more users and the one or more entities; and
   ordering, by the computer system, the search results based on the communication dataset in order from most relevant to least relevant to the user performing the communication initiation search,
   wherein ordering the search results based on the communication dataset further comprises determining relevancy as a function of responsiveness of the one or more entities to past user queries, the responsiveness of the one or more entities determined from at least a response time associated with a successful attempt of a user to communicate with the one or more entities.

2. The method of claim 1, wherein receiving the search query further comprises receiving the search query based on a search by the user to initiate communication with the one or more entities via the communication system.

3. The method of claim 1, further comprising processing the communication metadata and generating the communication dataset based on the communication metadata.

4. The method of claim 3, wherein the communication metadata comprises explicit metadata generated based communications between users of the communication system and a plurality of the one or more entities, the explicit metadata including metrics relating to one or more of user generated subjective ratings of a degree of satisfaction with a communication between a user and the one or more entities, a level of quality of a communication between a user and the one or more entities, and a level of responsiveness of the one or more entities to a communication from a user.

5. The method of claim 3, wherein the communication metadata comprises explicit metadata generated based on a rating value provided by users of the communication system, the rating value based on communications between users of the communication system and a plurality of the one or more entities.

6. The method of claim 3, wherein processing the metadata further comprises assigning a weight value to the metadata based on an indication of the responsiveness of the one or more entities to past user queries.

7. The method of claim 1, further comprising providing the ordered search results to the user.

8. The method of claim 1, wherein obtaining search results from the search engine further comprises obtaining a search engine dataset.

9. The method of claim 1, further comprising providing the communication relevancy dataset to a third party.

10. A system for generating relevant search results for a user performing a communication initiation search, the system comprising:
   an interface, configured to receive a search query from the user, and to receive communication metadata from a communication system the communication metadata including metrics pertaining to communications between one or more users and one or more entities;
   a search engine interface, configured to obtain search results regarding the one or more entities from a search engine based on the search query; and
   a communication dataset builder configured to:
   analyze the communication metadata and generate a communication relevancy dataset based on the communication metadata;
   link the search results regarding the one or more entities from the search engine to the communication relevancy dataset; and
   order the search results regarding the one or more entities based on relevancy to the user performing a communication initiation search, the relevancy to the user determined from the communication relevancy dataset,
   wherein ordering the search results based on the communication dataset further comprises determining relevancy as a function of responsiveness of the one or more entities to past user queries, the responsiveness of the one or more entities determined from at least a response time associated with a successful attempt of a user to communicate with the one or more entities.

11. The system of claim 10, wherein performing the communication initiation search further comprises performing a search by the user to initiate communication with the one or more entities via the communication system.

12. The system of claim 10, wherein the communication metadata comprises implicit metadata generated based on communications between users of the communication system and a plurality of entities, the implicit metadata including one or more of a number of attempts to communicate with the one or more entities, a number of instances of successful communication with the one or more entities, a number of instances of unsuccessful attempts to communicate with the one or more entities, an indication of whether the one or more entities is available for a web-chat, a length of time of a successful communication with the one or more entities, a number of repeat instances of communications between a user and the one or more entities, a response time associated with a successful attempt to communicate with the one or more entities, and a measure of quality of information communicated in a successful communication instance with the one or more entities.

13. The system of claim 10, wherein the communication metadata comprises explicit metadata generated based on a rating value provided by users of the communication system, the rating value is based on communications between users of the communication system and a plurality of the one or more entities.

14. The system of claim 13, wherein the communication dataset builder is further configured to process the communication metadata to generate the communication dataset based on the metadata.

15. The system of claim 13, wherein the communication dataset builder is further configured to assign a weight value to the communication metadata based on an indication of the responsiveness of the one or more entities to past user queries.

16. The system of claim 10, wherein the search engine interface is further configured to obtain a search engine dataset from the search engine.

17. A non-transitory computer readable medium having stored thereon sequences of instruction for generating relevant search results for a user, including instructions that will cause at least one processor to:
receive a search query regarding one or more entities from the user performing a communication initiation search;
receive search results regarding the one or more entities from a search engine based on the search query;
link the search results regarding the one or more entities to a communications dataset generated based on communication metadata received from a communication system, the communication metadata including metrics pertaining to communications between one or more users and the one or more entities; and
order the search results regarding the one or more entities based on the communication dataset in order from most relevant to least relevant to the user performing the communication initiation search,
wherein ordering the search results based on the communication dataset further comprises determining relevancy as a function of responsiveness of the one or more entities to past user queries, the responsiveness of the one or more entities determined from at least a response time associated with a successful attempt of a user to communicate with the one or more entities.

18. The non-transitory computer readable medium of claim 17, further comprising instructions that will cause at least one processor to receive the search query based on a search by the user to initiate communication with the one or more entities via the communication system.

* * * * *